United States Patent
Bonacci et al.

(10) Patent No.: US 9,986,869 B2
(45) Date of Patent: Jun. 5, 2018

(54) SELF-LOCKING MULTI-SIZE CARTRIDGE EXTRACTION UNIT

(71) Applicant: NESTEC S.A., Vevey (CH)

(72) Inventors: Enzo Bonacci, Savigny (CH); Jean-Marc Flick, Pomy (CH)

(73) Assignee: Nestec S.A., Vevey (CH)

( * ) Notice: Subject to any disclaimer, the term of this patent is extended or adjusted under 35 U.S.C. 154(b) by 383 days.

(21) Appl. No.: 14/653,993

(22) PCT Filed: Dec. 19, 2013

(86) PCT No.: PCT/EP2013/077272
§ 371 (c)(1),
(2) Date: Jun. 19, 2015

(87) PCT Pub. No.: WO2014/096120
PCT Pub. Date: Jun. 26, 2014

(65) Prior Publication Data
US 2015/0342394 A1 Dec. 3, 2015

(30) Foreign Application Priority Data
Dec. 19, 2012 (EP) ..................................... 12197961

(51) Int. Cl.
*A47J 31/40* (2006.01)
*A47J 31/06* (2006.01)

(52) U.S. Cl.
CPC ......... *A47J 31/407* (2013.01); *A47J 31/0647* (2013.01); *A47J 31/0668* (2013.01)

(58) Field of Classification Search
CPC ..................................... A47J 31/3623–31/3642
(Continued)

(56) References Cited

U.S. PATENT DOCUMENTS

2003/0066431 A1* 4/2003 Fanzutti .................. A47J 31/36
99/279
2004/0031394 A1* 2/2004 Yoakim ............... A47J 31/0668
99/279

(Continued)

FOREIGN PATENT DOCUMENTS

EP 1208782 5/2002
EP 2409608 1/2012

*Primary Examiner* — Michael Laflame, Jr.
(74) *Attorney, Agent, or Firm* — K&L Gates LLP (57) ABSTRACT

An extraction unit (10) for extracting cartridges (1a; 1b) of two different heights (ha;hb) comprises a seat (11, 12, 13; 15) for receiving any of such cartridges (1a; 1b) for extraction thereof in the seat. The seat is delimited by a first part (11,12,13) and second part (15) that are relatively movable between a cartridge extraction position and a cartridge loading and/or ejection position. The first part (11,12,13) has a first portion (11,12) and a second portion (13) that are relatively movable to delimit a cavity (12') having selectively: —a first depth (da) for receiving a cartridge (1a) of the first height (ha); and —a second depth (db) for receiving a cartridge (1b) of the second height (hb), the first part (11,12,13) has a lock (112', 132, 132', 142') for locking the first and second portions (11,12,13) when the delimited cavity (12') has the first depth (da) or the second depth (db). Such extraction unit (10) further comprises a mechanical sensor (14) that senses the height (ha;hb) of a cartridge (1a; 1b) and that controls the lock (112', 132, 132', 142') to lock or unlock the first and second portions (11,12,13) when the sensor is actuated by a cartridge of first height (ha) or of second height (hb).

19 Claims, 5 Drawing Sheets (58) Field of Classification Search
USPC .......................... 99/279, 280, 283, 284, 285
See application file for complete search history.

(56) References Cited

U.S. PATENT DOCUMENTS

| | | | |
|---|---|---|---|
| 2007/0104837 A1* | 5/2007 | Yoakim | A47J 31/0668 426/77 |
| 2013/0114089 A1* | 5/2013 | Jarisch | A47J 31/0668 356/614 |

* cited by examiner

SELF-LOCKING MULTI-SIZE CARTRIDGE EXTRACTION UNIT

CROSS REFERENCE TO RELATED APPLICATIONS

The present application is a National Stage of International Application No. PCT/EP2013/077272, filed on Dec. 19, 2013, which claims priority to European Patent Application No. 12197961.1, filed on Dec. 19, 2012, the entire contents of which are being incorporated herein by reference.

FIELD OF THE INVENTION

The present invention relates to an extraction unit using cartridges that contain a beverage ingredient for preparing a beverage or another substance not necessarily food-related. The extraction unit is arranged for receiving cartridges of different sizes. The invention also relates to a combination of such an extraction unit with a cartridge and a use of a cartridge for such an extraction unit.

For the purpose of the present description, a "beverage" is meant to include any liquid food, such as tea, coffee, hot or cold chocolate, milk, soup, baby food, etc. . . . A "cartridge" is meant to include any pre-portioned beverage ingredient or other extractible substance within an enclosing packaging of any material, in particular an airtight packaging, e.g. plastic, aluminium, recyclable and/or biodegradable packagings, and of any shape and structure, including soft pods or rigid capsules containing the ingredient.

BACKGROUND ART

One problem encountered is the positioning of the cartridge in the device and the closing of the latter around the cartridge to perform the brewing process. The cartridge usually has to be positioned by the user on a cartridge support or in a housing, then the device is closed manually or automatically around the cartridge.

It is important to correctly position the cartridge so that the device closes correctly around the latter and a good seal is thus achieved to ensure good conditions of extraction. Bad positioning may damage the cartridge, and thus affect the conditions of extraction. The loading of the cartridge must also be easy, without trial and error as to the correct position of the cartridge in the device. The loading must also be as rapid as possible and not require excessive manipulations. Hence, devices exist that propose the insertion of the cartridge in a vertical plane and the movement of the extraction or infusion parts along a horizontal plane around the cartridge. Such systems have the advantages of allowing a loading from the top piggy-bank fashion, and makes for rapid loading. The positioning of the cartridge is then taken over by the movement of a movable part that pushes the cartridge against another part such as a water heater. However, these devices are complex to produce and are not suitable for low-cost and therefore entry-level coffee machines for the consumer market. They are therefore usually intended for the business market such as restaurants, bars or communities. For example, patent application WO 98/47418 relates to a device for the extraction of pre-measured inserts in which the inserts are inserted vertically and are extracted horizontally. The disadvantage of this device is that it comprises two movable parts for the extraction, which makes the mechanical principle more complicated.

WO 2005/004683 relates to a cartridge brewing device comprising: a first part; a second part that can be moved relative to the first part; a housing for the cartridge and defining, in a closed position of the movable part against the fixed part, an extraction position of the cartridge along an axis in said housing; an insertion and positioning part comprising means for guiding the cartridge arranged so as to insert the cartridge by gravity and position such cartridge in an intermediate position; a drink pouring system; and the second movable part is so arranged and constructed to move the cartridge from the intermediate position into the extraction position when the device is closed.

EP 1 721 553 discloses a brewing unit for coffee machines using cartridges. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a cartridge to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The cartridge is passed through the external housing to the infusion chamber via a rigid cartridge feed channel and then the cartridge is transferred into the infusion chamber by an external bushing on the movable rear part of the brewing unit which is provided with a cam-like path for moving the rear part. This arrangement involves several problems. The cartridge must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the cartridge, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee cartridge into the machine. The drawer is movable between an open and a closed position and has two cartridge half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a cartridge therein. When slid into the machine, the drawer can be moved upwards towards a fixed cartridge cage for form a brewing chamber for a cartridge. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 7,131,369, US 2005/0106288, US 2006/0102008, WO 2005/002405, WO 2005/016093, WO 2006/005756, WO 2006/066626 and WO 2007/135136.

A beverage preparation machine arranged to handle ingredient cartridges of different sizes is disclosed in EP 1 208 782. Other machines handling cartridges of different sizes are disclosed in non-prepublished documents EP 12187716.1, EP 12187717.9, EP 12187718.7 and EP 12189153.5.

SUMMARY OF THE INVENTION

One aspect of the present invention relates to an extraction unit for extracting cartridges of two different heights. The unit comprises a seat for receiving any of such cartridges for extraction thereof in the seat. The seat is delimited by a first part and a second part that are relatively movable between a cartridge extraction position and a cartridge loading and/or ejection position.

For instance, the first part is connected to a fluid circuit for circulating a fluid, such as heated or cooled water, from a source into the seat and the second part is connected to an outlet for a product formed by exposing the content of a cartridge in the seat to the circulating liquid. Alternatively, the first part is connected to an outlet and the second part is connected to the fluid circuit, or the first part is connected to the outlet and the fluid circuit, or the second part is connected to the outlet and the fluid circuit. A suitable fluid circulation system is for example disclosed in EP 1 764 014, WO 2009/074550 and WO 2998/130099.

The first part has a first portion and a second portion that are relatively movable to delimit a cavity having selectively:
 a first depth for receiving a cartridge of the first height; and
 a second depth for receiving a cartridge of the second height.

In other words, the first and second portions are relatively movable into two positions:
 a first depth position, e.g. a shallow position, for receiving a cartridge of the first height, e.g. a small cartridge; and
 a second depth position, e.g. a deep position, for receiving a cartridge of the second height, e.g. a large cartridge.

Each portion of the first and second portions may be formed of a single component or of an assembly of components.

Furthermore, the first part has a lock for locking the first and second portions when the delimited cavity has the first depth or the second depth. For instance, the lock may be arranged to lock first and second portions in both of first and second depths positions or in only one of the first and second depth positions.

For example, the lock is arranged to lock the first and second portions in the first depth position and not in the second depth position. In the latter position, the first and second portions may be blocked in an end-of-movement position by a cartridge of second height.

The extraction unit further comprises a mechanical sensor that senses the height of a cartridge and that controls the lock to lock or unlock the first and second portions when the sensor is actuated by a cartridge of first height or of second height.

Hence, the sensor may be actuated by a cartridge of any of the different heights or only by a cartridge of one of the different heights, e.g. only by a cartridge of the second height. The sensor has optionally a default configuration or position that corresponds to a cartridge of the first height, in which case the sensor does not need to be mechanically actuated to sense the cartridge of the first height.

The mechanical sensor may have at least one member that extends into the cavity of first and second depth and that senses the height of a cartridge at entry of a cartridge into the cavity. At least one member can be shaped to open, in particular by piercing, a cartridge. Such member can form at least one of a blade and a pin. Examples of blades and pins for opening a cartridge are disclosed in CH 605 293 and in EP 1 299 022.

For instance, the mechanical sensor controls the lock via a fully mechanical arrangement. It is of course also possible to use a lock that is controlled electrically or electromechanically or fluidically via the mechanical lock. These alternatives may be of particular interest when the lock is not a simple mechanical lock but includes electric, electromagnetic and/or hydraulic components. When the lock is itself only mechanical, the sensor, the lock and the control arrangement between the sensor and the lock may all be entirely mechanical.

Typically, the cavity of first and second depths is delimited by an inner wall extending about an axis of the first portion:
 from a mouth of the cavity forming an entry for a cartridge into the cavity
 to an opposite end at which the second portion can relatively move respectively towards and away from the mouth generally along the above axis to delimit the cavity respectively with the first and second depths.

Optionally, the opposite end forms an opening through which the second portion is movable along the axis to delimit the cavity respectively with the first and second depths. For instance, the second portion telescopes into and out of the above mention inner wall or the second portion telescopes about the first portion.

Typically, the cartridge has a cartridge axis of symmetry or of revolution that is generally parallel to the axis of the first part when the cartridge is located in the seat in the extraction position. The sensor may be movable generally parallel to the axis to sense the height of a cartridge. For example, the sensor is translationally mounted in or on the second portion. The second portion and the sensor may have a corresponding bearing such as a plain bearing for allowing relative movements of the sensor and the second portion.

The first portion may have a support:
 which is integral with or mounted to a cartridge receiver, in particular slightly movably mounted to compensate for a play of the first part and the second part in the extraction position, optionally the cartridge receiver being hydraulically movable along the support and sealed via a seal and/or being guided along the support via a guiding protrusion and cooperating guiding slot, e.g. as disclosed in EP 2 068 683; and along which the second portion is relatively movable to the first portion, in particular translationally movable, to delimit the cavity having selectively the first depth and the second depth.

The first portion, in particular the support, and the second portion can be sealed by a seal secured in a recess.

The lock may have at least one barrier member, such as a barrier prism or roller or ball, that has:

a locked position in which the barrier member intercepts the first portion and the second portion to lock the first and second portions for defining the cavity with the first depth or the second depth; and has an unlocked position in which the barrier member is separated from at least one of the first and second portions.

In this context, the barrier member is deemed to be separated from the first and/or the second portions when the first and second portions are not prevented by the barrier member from relatively moving between the first and second depth positions for forming the cavity of first and second depths. For this purpose, it is not necessary that the barrier member is physically or mechanically separated (or otherwise contactless) from the first and/or second portions; it is sufficient that the barrier member is functionally separated from the first and/or second portions in such a manner as to allow the relative movement of the portions.

For instance, the barrier member can selectively engage with and disengage from a barrier receiver, such as a protrusion or a recess, of the separable portion.

The barrier member may be separable from one of the first and second portions and guided, in particular by a supporting arm or a passage, along the other of the first and second portions.

The sensor may have a selector, such as a two-level surface, that selectively: secures the barrier member in the locked position; and releases the barrier member from the locked position so that it can move into the unlocked position.

To control the lock, the sensor may be movable into: a first sensor position by a cartridge of the first height; and/or a second sensor position by a cartridge of the second height. For example, the sensor is movable by a bottom part of a cartridge receptacle of a cartridge. The sensor may be biased, in particular by a spring, into: the first sensor position and movable by a cartridge of the second height into a second sensor position; or the second sensor position and movable by a cartridge of the first height into the first sensor position. For example, the sensor is biased by a spring extending between the sensor and at least one of the first and second portions and/or along an axis of the first and second portions. The sensor may have a cartridge opening member, in particular a member extending generally parallel to an axis of relative movement of a cartridge against the sensor, and is so biased that a mere opening of a cartridge is insufficient to move the sensor for locking or unlocking the lock.

The first and second portions can be relatively movable to delimit the cavity having the first depth by a cartridge of the first height acting on the first and/or second portions. The first and second portions may be relatively movable to delimit the cavity having the second depth by a cartridge of the second height acting on the first and/or second portions. In either case, the first and second portions can be relatively moved by receiving the cartridge in the seat. For instance, the first part and the second part are relatively moved to the cartridge extraction position with such a cartridge between the first and second parts. For example, a bottom part of a cartridge receptacle of the cartridge acts on (e.g. pushes) a receiving surface of the first and second portions. Such a surface can have a shape generally matching the bottom part of the cartridge. Such surface may be generally transverse to an axis of the first and second portions.

The first and second portions may be biased, in particular by a spring, to delimit the cavity having: the first depth, the first and second portions being relatively movable to delimit the cavity having the second depth by a cartridge of the second height acting on the first and/or second portions; or the second depth, the first and second portions being relatively movable to delimit the cavity having the first depth by a cartridge of the first height acting on the first and/or second portions. The first and second portions can be relatively movable by receiving said cartridge in the seat, in particular by relatively moving the first part and the second part to the cartridge extraction position with the cartridge between the first and second parts.

In an advantageous embodiment, the sensor and the first and second portions are biased by a same spring.

In an advantageous embodiment, the seat, in particular the first part, has depth detecting arrangement. This detecting arrangement may include a control unit, e.g. a microcontroller, connected to a sensor via a connection. The depth detecting arrangement can be configured to detect when the first portion and the second portion delimit the cavity with at least one of the first and second depths in particular by detecting a relative position of the first portion and the second portion. The detecting arrangement can be configured to detect when the first and second portions are locked or unlocked by the lock. The detecting arrangement can be configured to adjust an extraction parameter, for instance a volume and/or a temperature of liquid such as water circulated into the seat, depending on the detected depth of the seat.

The invention also relates to a combination of an extraction unit as described above and a cartridge selected from cartridges of two different heights receivable in the unit for extraction.

The cartridge can have a generally cup-shaped receptacle with a bottom, in particular a receptacle for containing an ingredient that is extended on at least one side of the cartridge by a protruding cartridge guide and covered by a lid. The cup-shaped receptacle of at least one cartridge of the cartridges of different heights may actuate the sensor and relatively moves the first and second portions to delimit the cavity of the first depth or of the second depth.

Another aspect of the invention relates to a use, for providing a combination as described above, of a cartridge selected from cartridges of two different heights.

Further features and advantages of the invention will appear in the detailed description below.

BRIEF DESCRIPTION OF THE DRAWINGS

The invention will now be described with reference to the schematic drawings, wherein.

DETAILED DESCRIPTION

A particular non-limiting embodiment of the invention is now described in relation with FIGS. 1 to 6.

An exemplary extraction unit 10 and components thereof are illustrated in FIGS. 2a to 6. Such unit 10 is configured for extracting cartridges 1a;1b of two different heights ha;hb. Unit 10 comprises a seat 11,12,13;15 for receiving any of cartridges 1a;1b for extraction thereof in the seat which is delimited by a first part 11,12,13 and second part 15 that are relatively movable between a cartridge extraction position (FIG. 2b) and a cartridge loading and/or ejection position (not shown).

For instance, extraction unit 10 comprises a piston-type extraction seat 11,12,13;15 for a cartridge 1a;1b having its own sealing member, as for instance described in WO 2008/037642.

Such an extraction unit 10 may be incorporated into a beverage preparation machine arranged for receiving such cartridge 1a;1b and extract an ingredient contained in the cartridge for preparing a beverage.

For guiding cartridge 1a;1b from outside to seat 11,12, 13;15, a guide arrangement, e.g. a pair of upright slides may be used to insert the cartridge by gravity via the slides. To immobilize the cartridge inbetween first 11,12,13 and second part 15 of the seat when in the loading position, a stopping device may be associated with the slides. Cartridge 1a;1b is then enclosed by first and second parts 11,12,13;15 that are moved together into the extraction position. The cartridge is then extracted by circulating an extraction liquid, e.g. water such as heated or cooled water, through the cartridge. Upon extraction, first and second parts 11,12,13; 15 are moved apart into the ejection position in which the cartridge can be ejected, e.g. evacuated by gravity.

Examples of cartridge handling principles that can be implemented in an extraction unit in accordance with the invention, in particular embodiments of the manner by which the cartridge can be retained in the brewing unit in position before closure, are disclosed in WO 2005/004683, the content of which is hereby included by way of reference. Generally speaking, the extraction unit may be of the type disclosed in WO 2005/004683, WO2007/135136, WO 2009/043630, WO 2012/025258 or WO 2012/025259. First and second parts 11,12,13;15 may be moved between the extraction position and the load Second part 15 may include a beverage collector or guide and be associated with a beverage outlet 16. Second part 15, e.g. an extraction plate that may include opening members for instance of the type disclosed in EP 512 470 or simply one or more fluid passages, may be mounted fixedly or movably in a beverage preparation machine.

Likewise, first part 11,12,13 can be connected to a fluid source, such as a source of heated or cooled water, and can be mounted fixedly or movably in a beverage preparation machine.

First part 11,12,13 has a first portion 11,12 and a second portion 13 that are relatively movable to delimit a cavity 12' having selectively:
  a first depth da for receiving a cartridge 1a of first height ha; and
  a second depth db for receiving a cartridge 1b of second height hb.

For instance, first portion forms a generally hollow member 11,12 and second portion 13 forms a piston member 13 movable in hollow member 11,12. Piston member 13 is in particular movable along an axis 13' of hollow member 11,12 and is optionally generally coaxial therewith.

First portion 11,12 may include a support 11 and a cartridge receiver 12. Receiver 12 may be fixed or integral with support 11. Alternatively receiver 12 may be slightly movable within support 11, e.g. for compensating a play between first part 11,12,13 and second part 15.

Receiver 12 may have a generally cylindrical or frusto-conical or frusto-domical inner surface 121 for receiving cartridges 1a;1b. Typically, inner surface 121 is generally shaped to fit the shape of cartridges 1a;1b.

In particular, support 11 may have a front part 111 to which receiver 12 is mounted; for instance, receiver 12 is mounted inside front part 111. Support 11 may have a rear part 112 to which second portion 13, e.g. a piston member 13, is movably mounted; for instance second portion 13 is movably mounted inside rear part 112. Second portion 13 may be biased towards and/or into receiver 12 by a spring 142 such as a compression spring, e.g. a spring housed inbetween a rear bottom of support 11 and second portion 13.

First part 11,12,13 has a lock 112',132,132',142' for locking first and second portions 11,12,13 when the delimited cavity 12' has first depth da or second depth db. Hence, the first and second portions may be locked by the lock when the cavity has either of the first and second depths or only when the cavity has one of the first and second depths but not when it has the other depth.

Figure 3A:
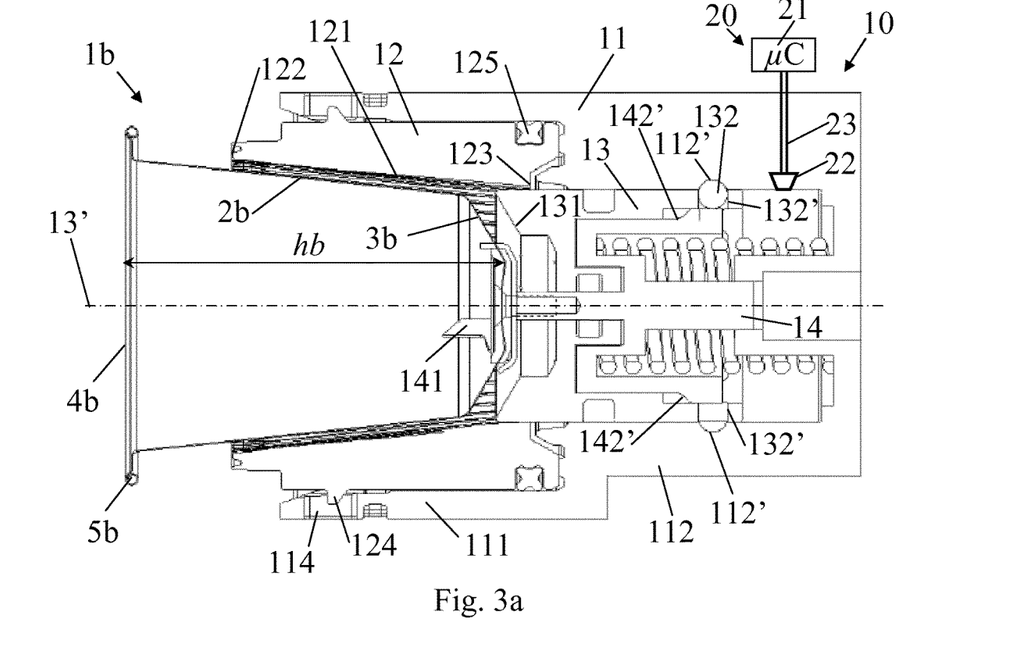
FIGS. 3a to 3c are cross-sectional views of the extraction unit of FIGS. 2a and 2b with a cartridge of a second height according to the invention.
Figure 3B:
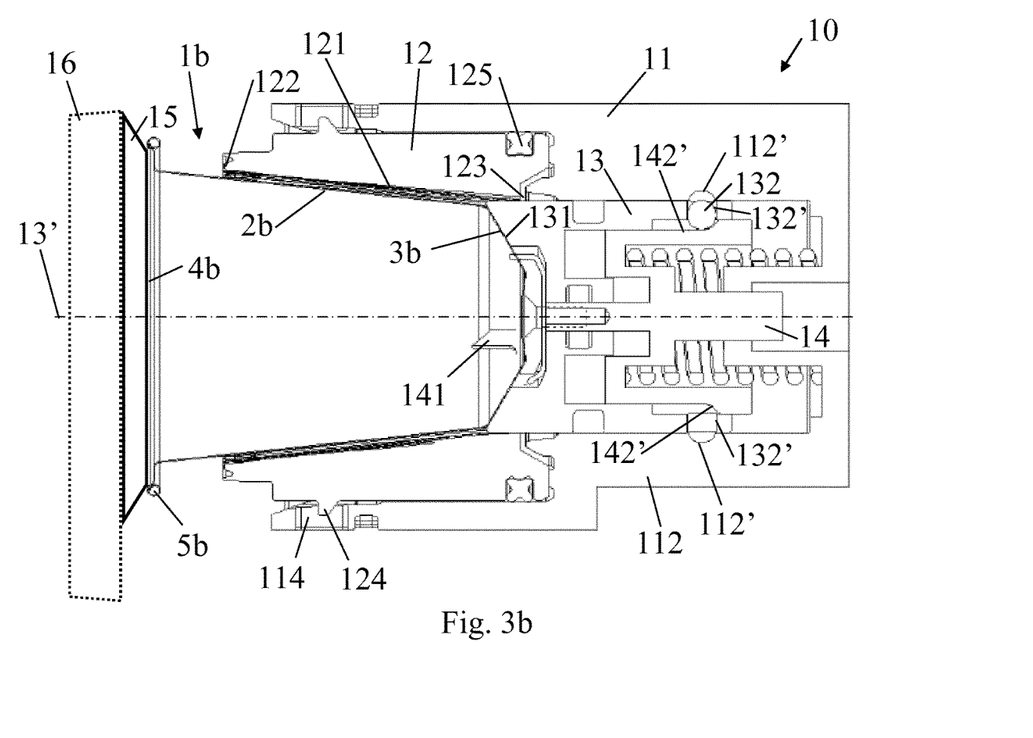
Figure 3C:
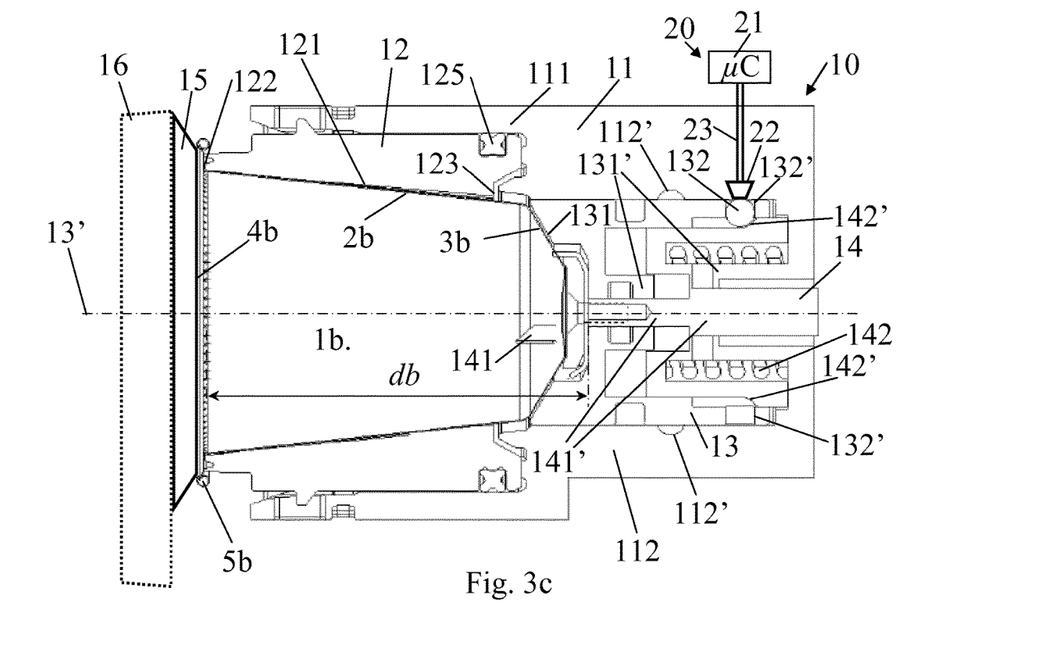
Figure 4:
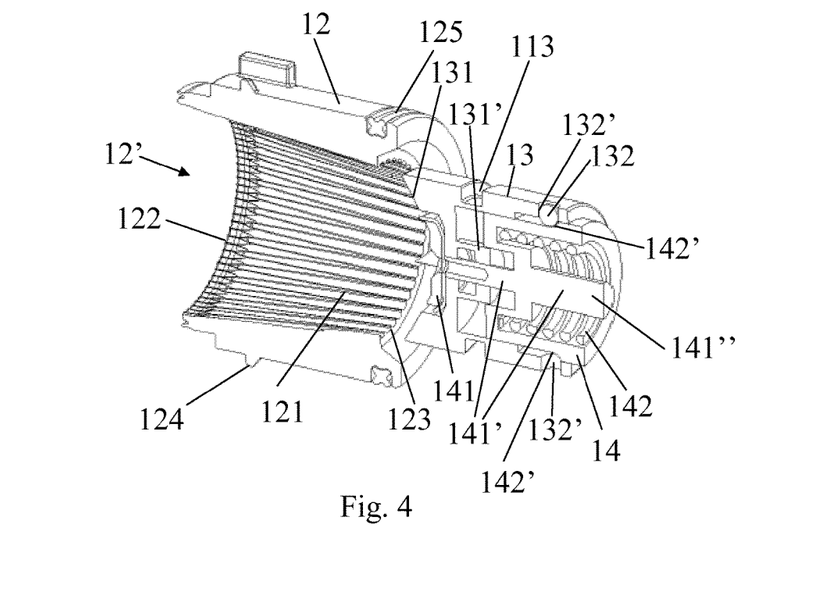
FIGS. 4 to 6 are illustrations of parts of the extraction unit of FIGS. 2a to 3c.
Figure 5:
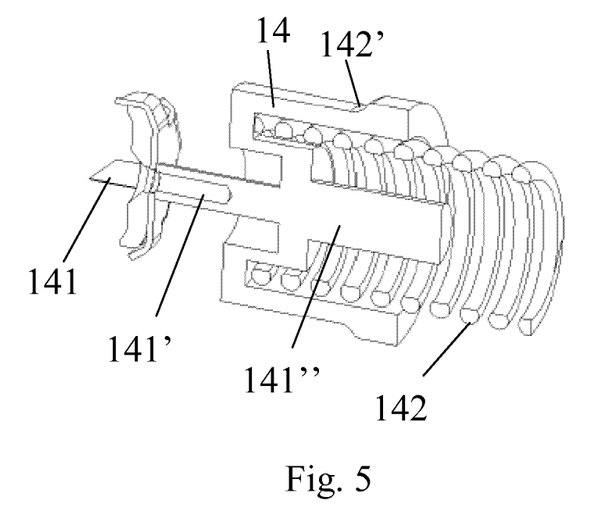
Figure 6:
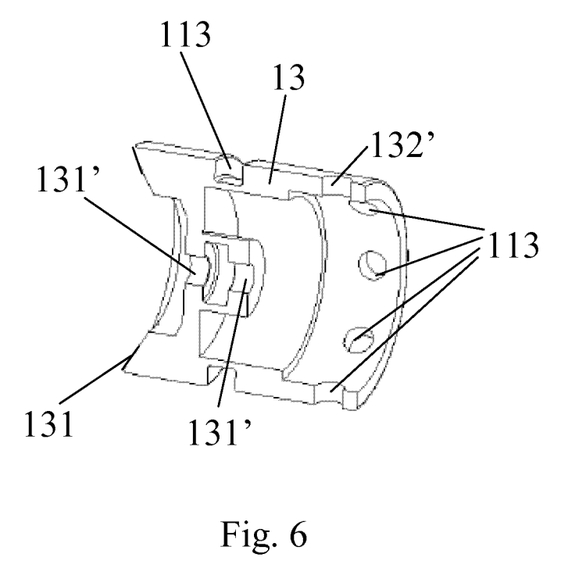

In the very particular example illustrated in FIGS. 2a to 6, first and second portions 11,12,13 are only locked by lock 112',132,132',142' when the cavity has the first depth da (FIGS. 2a,2b and 3b) but not when the cavity has the second depth db (FIG. 3c). In the latter case, first and second portions 11,12,13 are urged apart into a blocking position by the presence of cartridge 1b held between first and second parts 11,12,13.

Unit 10 further comprises a mechanical sensor 14 that senses the height ha;hb of a cartridge 1a;1b and that controls the lock 112',132,132',142' to lock or unlock the first and second portions 11,12,13 when the sensor is actuated by a cartridge of first height ha or of second height hb. Hence, the sensor may be actuated by a cartridge of any of the different heights or only by a cartridge of one of the different heights.

In the very particular example illustrated in FIGS. 2a to 3c, sensor 14 is only actuated by cartridge 1b of height 1a but not by cartridge 1a of height ha. Hence, the default configuration of unit 10 with sensor 14 is based on the cartridge height ha (FIGS. 2a,2b), the sensor being actuated and the unit 10 changed only by the presence of a cartridge 1b (FIGS. 3a to 3c).

Extraction unit 10 may be mounted in a beverage preparation machine as known in the art, e.g. provided with the functionalities disclosed in WO 2009/074550, e.g. a fluid line, a pump, a temperature conditioner such as a heater and/or a cooler, a water tank or other ingredient feeder, a waste ingredient collector, etc. . . .

Figure 1A:
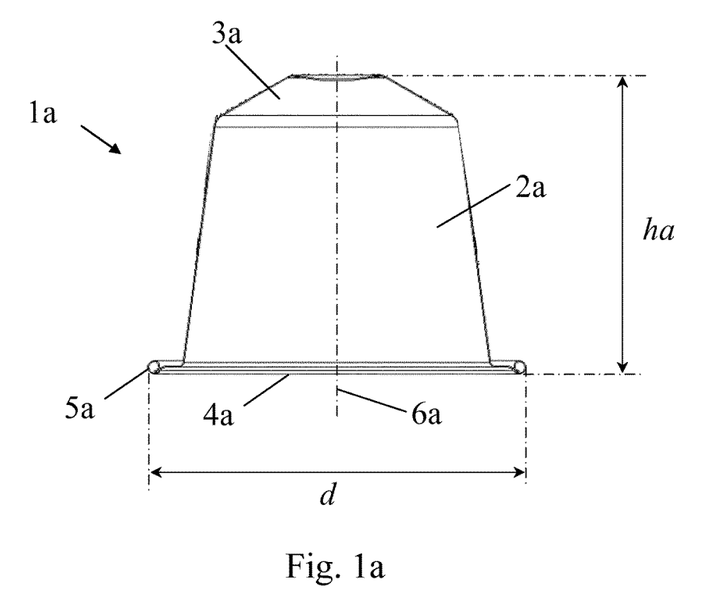
FIGS. 1a and 1b show two cartridges of different heights for extraction in an extraction unit according to the invention.
Figure 1B:
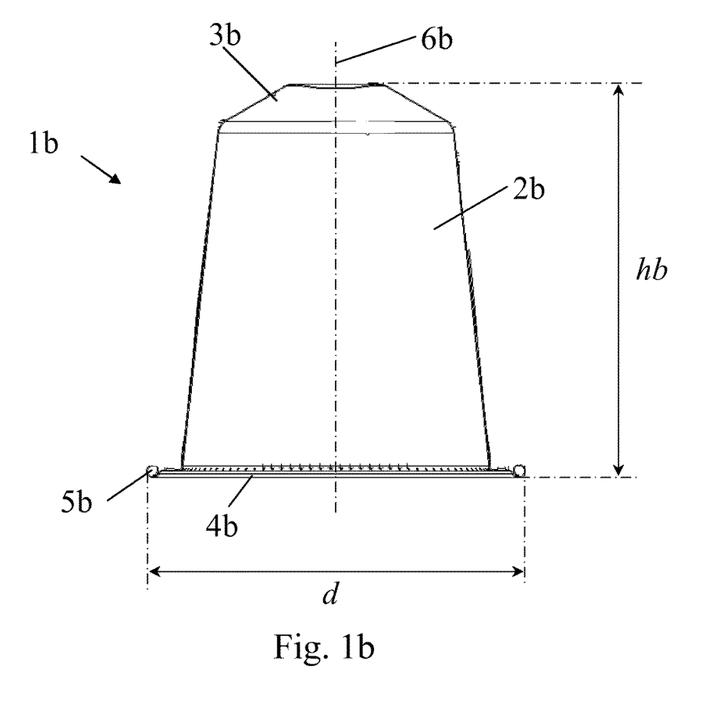
Figure 2A:
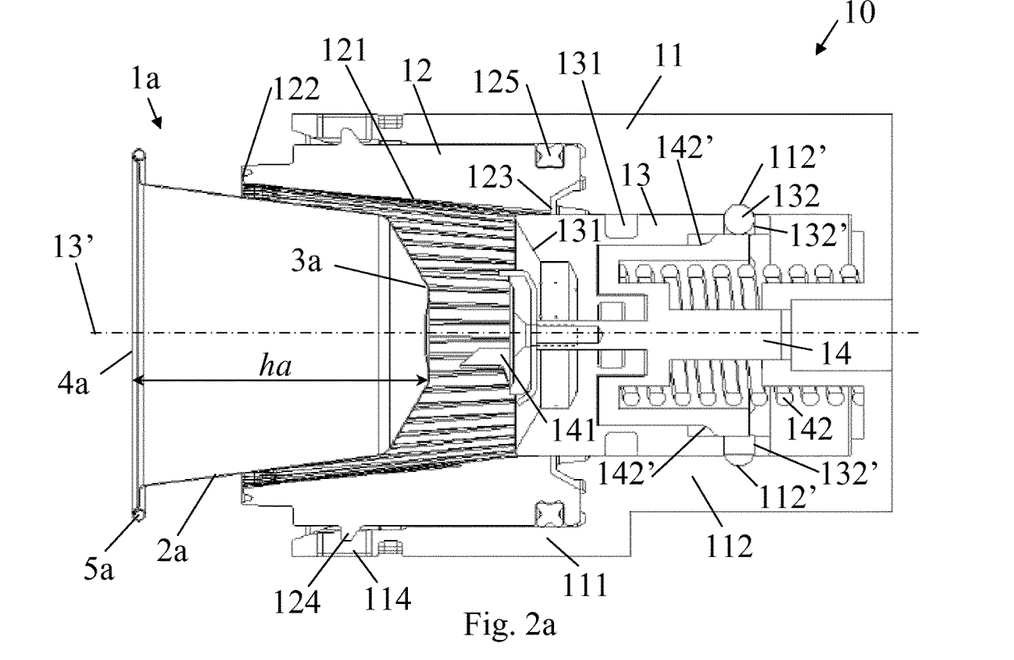
FIGS. 2a and 2b are cross-sectional views of an extraction unit with a cartridge of a first height according to the invention.
Figure 2B:
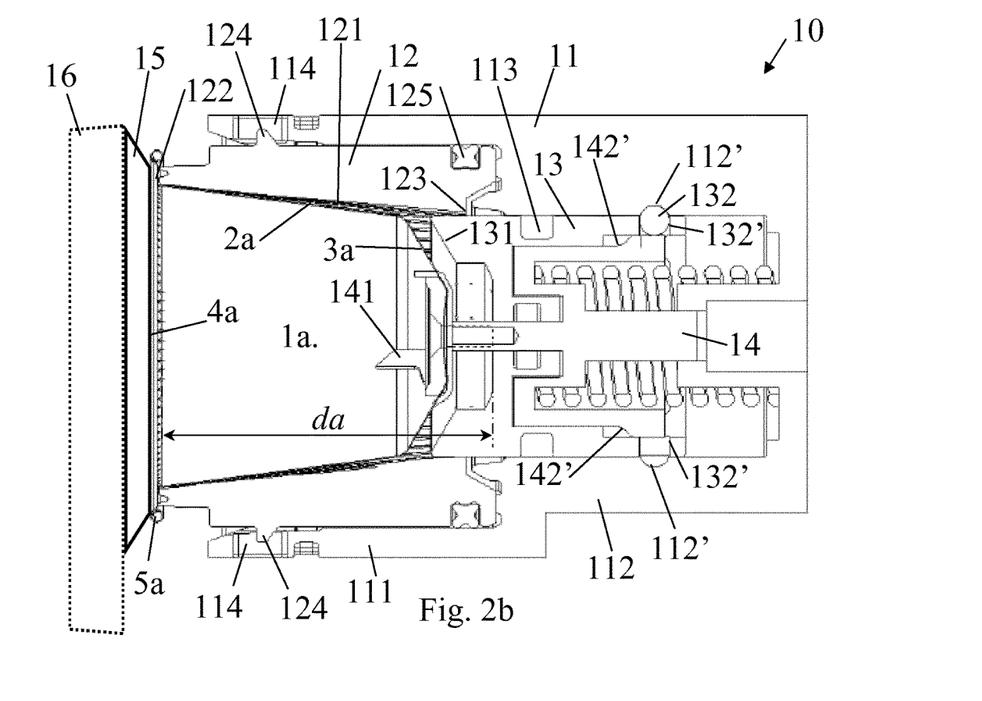

Suitable cartridges 1a;1b are illustrated in FIGS. 1a and 1b. Typically, cartridge 1a;1b has a generally cup-shaped receptacle 2a;2b with a bottom 3a;3b, in particular a receptacle for containing an ingredient that is extended on at least one side of the cartridge by a protruding cartridge guide 5a;5b and covered by a lid 4a;4b. Cup-shaped receptacle 2a;2b of at least one cartridge 1a;1b of the cartridges of different heights ha;hb may actuate sensor 14 and relatively move first and second portions 11,12,13 to delimit cavity 12' of first depth da or of second depth db. Cup-shaped receptacle 2a;2b may be generally cylindrical, conical, frustoconical, domical, or a combination thereof.

A cartridge 1a of small height ha is illustrated in FIG. 1a. A cartridge 1b of greater height hb is illustrated in FIG. 1b. Cartridges 1a,1b may have the same diameter d or a different diameter.

Cartridge 1b has a greater inner volume than cartridge 1a and has thus more space for containing an ingredient, e.g. a beverage ingredient such as coffee, tea, cocoa, milk, etc. . . .

For instance, cartridge 1a has a volume for containing 3-6 g ground coffee for the preparation on a ristretto or espresso coffee. Cartridge 1b may have a volume for containing 5-10 g ground coffee for the preparation of a lungo or americano coffee.

Cartridges 1a;1b may be used by circulating a liquid therethrough to mix it with an ingredient, e.g. a flavouring ingredient such as tea, coffee, cocoa, milk . . . and produce a beverage.

Liquid, e.g. heated or cold or cooled water, may be introduced at bottom 3a;3b, circulated inside the cartridge between the bottom and lid 4a;4b, e.g. generally along directions 6a;6b, and then collected at the lid, or vice versa.

The bottom and/or the lid of the cartridge may be opened or closed prior to use. When they are both opened, liquid is simply circulated through the cartridge, e.g. under pressure such as from above 1.5 bar to 25 bar, to form the beverage in the cartridge and collect it outside the cartridge. When the bottom and/or the lid is closed prior to use, the opening thereof may be achieved: prior to circulating the liquid, e.g. the bottom may be pierced by introducing appropriate piercing elements into the bottom prior to water circulation as for example disclosed in WO 02/00073 or in WO 02/35977; or under the effect of the circulating liquid, e.g. the lid may be torn open as for example disclosed in EP 512468 or in EP 512470.

For example, cartridge 1a;1b comprises a cup 2a;2b and a closing membrane 4a;4b which is sealed on the cup for forming a gastight enclosure containing ground coffee. The membrane of the cartridge forms the beverage delivery side of the cartridge that is torn in contact with a puncture plate 14. Tearing of membrane 4a;4b can be obtained by the rise in pressure that takes place in cartridge 1a;1b during injection of water in the cartridge. Membrane 4a;4b of the cartridge is so perforated to provide many small apertures from which the beverage can be released.

Mechanical sensor 14 can have at least one member 141 that extends into cavity 12' and that senses the height ha;hb of cartridge 1a;1b at entry of such cartridge into cavity 12'. Such member 141 may be shaped to open, in particular by piercing, a cartridge 1a;1b. In particular, member 14 can form a blade 141 of a pin. As mentioned above, in the particular embodiment illustrated in the Figures, sensor 14 is actuated only by a cartridge 1b of height hb but not be cartridge 1a.

Cavity 12' can be delimited by an inner wall 121 extending about an axis 13' of the first portion 11,12. For instance, axis 13' forms an axis of symmetry or of revolution of inner wall 121. In a particular embodiment, wall 121 is generally conical, cylindrical and/or domical.

Inner wall 121 may extend:
from a mouth 122 of cavity 12' forming an entry for a cartridge 1a;1b into cavity 12'
to an opposite end 123 at which second portion 13 can relatively move respectively towards and away from the mouth 122 generally along axis 13' to delimit cavity 12' respectively with the first and second depths da, db.

Optionally, this opposite end forms an opening 123 through which second portion 13 is movable along axis 13' to delimit cavity 12' respectively with the first and second depths da,db.

In particular, cartridge 1a;1b has a cartridge axis of symmetry or of revolution 6a;6b that is generally parallel to axis 13' when cartridge 1a;1b is located in seat 11,12,13;15 in the extraction position.

Sensor 14 can be movable generally parallel to axis 13' to sense height ha;hb of cartridge 1a;1b. Optionally sensor 14 is translationally mounted in or on second portion 13. Second portion 13 and sensor 14 may have a corresponding bearing such as a plain bearing 131',141'.

First portion 11,12 can have a support 11:
which is integral with or mounted to a cartridge receiver 12; and
along which the second portion 13 is relatively movable to first portion 11,12, in particular translationally movable, to delimit a cavity 12' having selectively first depth da and second depth db.

For instance, first portion 11,12, in particular support 11, and second portion 13 are sealed by a seal (not shown), e.g. an o-ring, secured in a recess 113.

Receiver 12 may forming the abovementioned surface 121 and mouth 122 and end 123.

Receiver 12 can be slightly movably mounted along support 11 to compensate for a play of first part 11,12,13 and second part 15 in the extraction position. For example, cartridge receiver 12 is hydraulically movable along support 11 and sealed via a seal 125, e.g. an o-ring, and/or is guided along support 11 via a guiding protrusion 124 and cooperating guiding slot 114.

In the illustrated embodiment, lock 112',132,132', 142' has at least one barrier member 132, in particular a plurality of members 132 such as three, four, six or eight members, e.g. in the form of a barrier prism or roller or ball 132, that has:
a locked position in which barrier member 132 intercepts first portion 11,12 and second portion 13 to lock first and second portions 11,12,13 for defining cavity 12' with first depth da (FIGS. 2a to 3a) or second depth db (in a different embodiment); and
has an unlocked position (FIGS. 3b and 3c) in which barrier member 132 is separated from at least one of the first and second portions 11,12,13.

Barrier member 132 can selectively engage with and disengage from a barrier receiver 112', such as a protrusion or a recess 112', of separable portion 11,12,13. Barrier member 132 may be separable from one of first and second portions 11,12,13 and guided, in particular at the end of a flexible arm or in a circulation passage 132', along the other of said first and second portions 11,12,13. In the illustrated embodiment, barrier member 132 is separable from first portion 11,12, in particular support 11 specifically from recess 112' in support 11, and guided along second portion 13, in particular in an passage 132' of second portion.

Sensor 14 can have a selector 142', such as a two-level surface 142' as illustrated in FIGS. 2a to 5, that selectively: secures barrier member 132 in the locked position; and releases the barrier member 132 from the locked position so that it can move into the unlocked position.

To control lock 112',132,132',142', sensor 14 is movable into:
a first sensor position by a cartridge 1a of the first height ha; and/or
a second sensor position by a cartridge 1b of the second height hb.

For example, sensor 14 is pushed and moved by a bottom part 3a;3b of a cartridge receptacle 2a;2b of a cartridge 1a; 1b.

Sensor 14 can be biased into:
 the first sensor position and movable by cartridge 1b of second height hb into a second sensor position; or
 the second sensor position and movable by a cartridge 1a of first height ha into the first sensor position.

Sensor 14 can be biased by a spring 142 such as a spring extending between sensor 14 and at least one of said first and second portions 11,12,13 and/or along an axis 13' of these first and second portions. For example, spring 142 extends between sensor 14 and support 11 and urges sensor towards mouth 122 of cavity 12'. In particular, spring 142 can be housed in a rear part 112 of support 11. A cartridge receiver 12 can be situated in or on a front part 111 of support 11.

Spring 142 may be a helicoidal compression spring. In different configurations other springs are contemplated, e.g. traction springs, spring blades, spiral springs, etc. . . . It is of course possible to use one or more springs. Other biasing elements are contemplated as well, such as one or more permanent magnets and/or electro-magnets.

Sensor 14 may have a cartridge opening member 141, in particular a member 141 extending generally parallel to an axis 13' of relative movement of cartridge 1a;1b against member 141. Sensor 14 may be so biased that a mere opening of cartridge 1a;1b by opening member 141, e.g. a piercing of the cartridge by member 141, is insufficient to move sensor 14 for locking or unlocking the lock 112',132, 132',142'. A sufficiently strong spring 142 may be chosen accordingly.

First and second portions 11,12,13 may be relatively moved by cartridge 1b of second (or greater) height hb acting on first and/or second portions 11,12,13 to delimit cavity 12' having second (or greater) depth db. In a non-illustrated embodiment, the first and second portions may be relatively movable by a cartridge of the first (or smaller) height acting on the first and/or second portions to delimit a cavity having the first (or smaller) depth. The relative movement of first and second portions 11,12,13 can be achieved by receiving cartridge 1a;1b in seat 11,12,13,15, in particular by relatively moving first part 11,12,13 and second part 15 to the cartridge extraction position with cartridge 1a;1b between first and second parts 11,12,13,15. A bottom part 3a;3b of a cartridge receptacle 2a;2b of cartridge 1a;1b can act on a receiving surface 131 of first and second portions 11,12,13 which surface 131 has a shape generally matching bottom part 3a;3b and/or which surface 131 is generally transverse to an axis 13' of first and second portions 11,12,13.

First and second portions 11,12,13 may be biased, in particular by a spring 142, to delimit cavity 12' having:
 the first (smaller) depth da, first and second portions 11,12,13 being relatively movable to delimit cavity 12' having second depth db by a cartridge 1b of second (greater) height hb acting on the first and/or second portions; or (in a non-illustrated embodiment)
 the second (greater) depth db, the first and second portions are relatively movable to delimit the cavity having the first depth da by a cartridge of the first (smaller) height ha acting on the first and/or second portions.

The action of cartridge 1a;1b typically results from receiving cartridge 1a;1b in seat 11,12,13,15, in particular by relatively moving first part 11,12,13 and the second part 15 to the cartridge extraction position with cartridge 1a;1b between first and second parts 11,12,13,15. By moving first and second parts together 11,12,13;15, cartridge 1a;1b may be urged into cartridge receiver 12.

Sensor 14 and first and second portions 11,12,13 can be biased by a same spring 124, as illustrated in FIGS. 2a to 4.

The cartridge is extracted by circulating an extraction liquid, e.g. water such as heated or cooled water, through the cartridge. Upon extraction, first and second parts 11,12,13; 15 are moved apart into the ejection position in which the cartridge can be ejected, e.g. evacuated by gravity.

Seat 11,12,13,15, in particular first part 11,12,13, can have a depth detecting arrangement 20. As for example illustrated in FIGS. 3a and 3c, such a detecting arrangement may include a control unit 21 connected to sensor 22 via a connection 23 such as electric wires.

Depth detecting arrangement 20 can be configured to detect when first portion 11,12 and second portion 13 delimit cavity 12' with at least one of the first and second depths da,db. For instance, detecting arrangement 20 is configured to detect when first and second portions 11,12,13 are locked or unlocked by lock 112',132,132',142'. In the illustrated embodiment of FIGS. 3a and 3c, detecting arrangement 20 is arranged to detect a presence of barrier member 132 in its unlocked position, once driven into a position corresponding to the configuration of cavity 12' having the second (greater) depth db. For instance, detecting arrangement 20 has a proximity sensor 22 for sensing the presence (or absence) of barrier member 132, such as a capacitive sensor.

Depth detecting arrangement 20 may be used to adjust an extraction parameter. For instance, control unit 21 is connected to and controls the circulation of an extraction liquid into cavity 12'. For example, when the depth detecting arrangement 20 detects that cavity 12' has a greater depth db, a larger volume of liquid is circulated than when cavity 12' is not in such a configuration.

As a variation, it is also possible to configure the depth detecting arrangement to detect when the cavity has the first (smaller) depth da. This may be achieved by placing sensor 22 adjacent to barrier receiver 112'.

The invention claimed is:

1. An extraction unit for extracting cartridges of two different heights comprising a first height and a second height, the unit comprising:
  a seat for receiving the cartridges for extraction thereof in the seat, the seat being defined by a first part and second part that are relatively movable between a cartridge extraction position and a cartridge loading and/or ejection position, the first part having a first portion and a second portion that are relatively movable to define a cavity having selectively:
  a first depth for receiving a cartridge of the first height;
  a second depth for receiving a cartridge of the second height;
  the first part having a lock for locking the first and second portions when the cavity has the first depth or the second depth; and
  a mechanical sensor that senses the height of a cartridge and controls the lock to lock or unlock the first and second portions when the mechanical sensor is actuated by a cartridge of the first height or of the second height.

2. The unit of claim 1, wherein the mechanical sensor has at least one member that extends into the cavity and senses the height of a cartridge at entry of the cartridge into the cavity.

3. The unit of claim 2, wherein the at least one member is shaped to open a cartridge.

4. The unit of claim 1, wherein the cavity is defined by an inner wall extending about an axis of the first portion:

from a mouth of the cavity forming an entry for a cartridge into the cavity,
to an opposite end at which the second portion can relatively move respectively towards and away from the mouth generally along the axis to define the cavity respectively with the first and second depths, the opposite end forming an opening through which the second portion is movable along the axis to delimit the cavity respectively with the first and second depths.

5. The unit of claim 4, wherein the mechanical sensor is movable generally parallel to the axis to sense the height of a cartridge.

6. The unit of claim 1, wherein the first portion has a support:
which is integral with or mounted to a cartridge receiver; and
along which the second portion is relatively movable to the first portion.

7. The unit of claim 1, wherein the lock has at least one barrier member that has:
a locked position in which the barrier member intercepts the first portion and the second portion to lock the first and second portions for defining the cavity with the first depth or the second depth; and
has an unlocked position in which the barrier member is separated from at least one of the first and second portions.

8. The unit of claim 7, wherein the barrier member:
selectively engages with and disengages from a barrier receiver; and/or
is separable from one of the first and second portions and guided along the other of the first and second portions.

9. The unit of claim 7, wherein the mechanical sensor has a selector that selectively: secures the barrier member in the locked position; and releases the barrier member from the locked position so that the barrier member can move into the unlocked position.

10. The unit of claim 1, wherein to control the lock the mechanical sensor is movable into:
a first sensor position by a cartridge of the first height; and/or
a second sensor position by a cartridge of the second height.

11. The unit of claim 10, wherein the mechanical sensor is biased into:
the first sensor position and movable by a cartridge of the second height into a second sensor position; or
the second sensor position and movable by a cartridge of the first height into the first sensor position.

12. The unit of claim 11, wherein the mechanical sensor has a cartridge opening member and is so biased that a mere opening of a cartridge is insufficient to move the mechanical sensor for locking or unlocking the lock.

13. The unit of claim 1, wherein the first and second portions are relatively movable to define the cavity having:
the first depth by a cartridge of the first height acting on the first and/or second portions; and/or
the second depth by a cartridge of the second height acting on the first and/or second portions,
by receiving the cartridge in the seat.

14. The unit of claim 13, wherein the first and second portions are biased to define the cavity having:
the first depth, the first and second portions being relatively movable to define the cavity having the second depth by a cartridge of the second height acting on the first and/or second portions; or
the second depth, the first and second portions being relatively movable to define the cavity having the first depth by a cartridge of the first height acting on the first and/or second portions,
by receiving the cartridge in the seat.

15. The unit of claim 11, wherein the mechanical sensor and the first and second portions are biased by a same spring.

16. The unit of claim 1, wherein the seat has a depth detecting arrangement configured to detect when the first portion and the second portion define the cavity with at least one of the first and second depths.

17. A combination of an extraction unit and a cartridge selected from cartridges of two different heights comprising a first height and a second height, wherein the unit comprises a seat in which the cartridge is received for extraction, the seat being defined by a first part and second part that are relatively movable between a cartridge extraction position and a cartridge loading and/or ejection position, the first part having a first portion and a second portion that are relatively movable to delimit a cavity having selectively:
a first depth for receiving the cartridge when of the first height; and
a second depth for receiving the cartridge when of the second height,
the first part having a lock for locking the first and second portions when the cavity has the first depth or the second depth, and
the unit comprises a mechanical sensor that senses the height of the cartridge and controls the lock to lock or unlock the first and second portions when the cartridge of the first height or of the second height actuates the mechanical sensor.

18. The combination of claim 17, wherein the cartridge has a generally cup-shaped receptacle with a bottom.

19. The combination of claim 18, wherein the cup-shaped receptacle of at least one cartridge of the cartridges of different heights actuates the mechanical sensor and relatively moves the first and second portions to define the cavity of the first depth or of the second depth.

* * * * *